Patented Sept. 30, 1930

1,776,925

UNITED STATES PATENT OFFICE

OTTO NICODEMUS AND WALTER BERNDT, OF HOCHST-ON-THE-MAIN, GERMANY, ASSIGNORS TO GENERAL ANILINE WORKS, INC., OF NEW YORK, N. Y., A CORPORATION OF DELAWARE

CYCLIC HYDROCARBON AND PROCESS FOR PREPARING THE SAME

No Drawing. Original application filed April 20, 1926, Serial No. 103,357, and in Germany June 22, 1925. Divided and this application filed November 21, 1927. Serial No. 234,906.

The present invention relates to a process of preparing cyclic compounds and to new products obtainable thereby. Its subject matter has been divided out from our application Serial No. 103,357, filed April 20, 1926.

We have found that when the vapors of certain compounds are conducted at an elevated temperature over highly porous bodies, such as highly active charcoal, silicagel or aluminagel, new cyclic systems are formed with a good yield and in a continuous and technically rapid way. The compounds to be used as starting materials in our process possess the atom grouping:

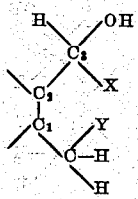

wherein $C_1$ and $C_2$ represent carbon atoms belonging to an aromatic or heterocyclic nucleus, X represents an aliphatic, aromatic or heterocyclic residue, in which at least one carbon atom which is in $\beta$ position to the carbon atom marked $C_3$ contains a hydrogen atom attached to it and Y represents hydrogen, chlorine or a hydrocarbon residue.

The term "elevated temperature" in our specification is intended to comprise such temperatures as are sufficient to cause a ring closing but are below a carbonizing temperature. It will be obvious that the suitable temperature ranges can be easily determined by experiment. The temperature ranges generally preferred by us vary between about 320° C. and about 450° C.

We have found that all secondary and tertiary aromatic or mixed alcohols, containing a methyl or methylene group in orthoposition to the carbinol group, are capable of forming cyclic chains. In this connection it has been observed that secondary reactions which are caused by the reducing action of the hydrogen produced during the operation are advantageously avoided by conducting the alcohol vapours, mixed with oxygen—for instance with air—or with oxygen-yielding agents, such as nitro bodies, over the highly porous bodies to which, if desired, some further oxygen carrying catalysts may be added for instance:

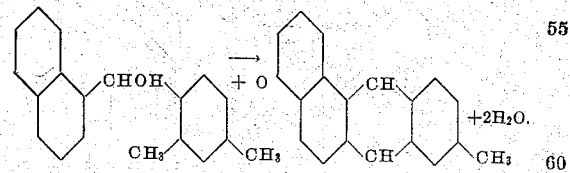

The closing of the chain takes place in this case with simultaneous formation of 2 mol. of water and it is immaterial whether the alcohol group is free or etherified or esterified. In every case, the formation of the ring takes place with elimination of the ether group or ester group in form of alcohol or an acid, provided, of course, that an ortho-position to the alcohol group is free which renders possible the formation of the cyclic chain.

The following examples serve to illustrate our invention and their wide range of application:

(1) Over a contact-substance consisting of highly active charcoal (activated with phosphoric acid) and charged with copper-cobaltic oxide, are conducted at 400° Celsius the vapours of di-p-xylylcarbinol M. P. 131° C. mixed with air. After having left the contact furnace the reaction product is condensed in a receiver and then separated from the water which has formed and recrystallized from toluene. Thus there is obtained 1-4-7-trimethylanthracene M. P. 226° C. in the amount of 50% of the theory. The unaltered starting material, after the solvent has been distilled therefrom, is returned into the furnace. The reaction occurs according to the following equations:

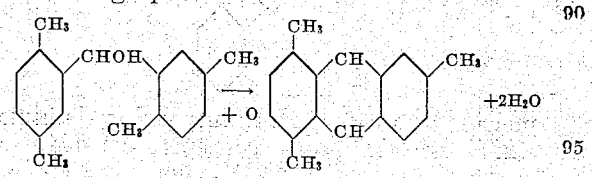

(2) Ortho-toluyl-5-acenaphthene is reduced and the carbinol, which melts at 145° C. and dissolves in sulfuric acid with an indigo-blue tint, is distilled mixed with air under reduced pressure over a catalyst made of highly active charcoal and heated to 320–340° C. Having regard to the fact that the acenaphthene derivative is highly decomposable, care must be taken that the passage of the gas through the reaction zone takes place rapidly. The product of the reaction is obtained as a solid cake which is dissolved hot in ligroine of a high boiling point. On cooling, the anthracene of the acenaphthene separates as light yellow leaflets which melt at 191° C. and dissolve in sulfuric acid with a reddish violet color of a strong fluorescence. The closing of the ring occurs according to the following scheme:

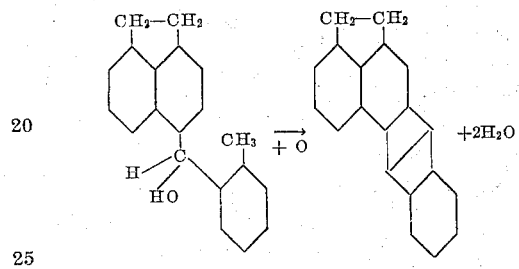

The yield amounts to 35% of the theory. The unaltered parent material is returned into the contact furnace. Analysis of the above mentioned anthracene showed:

94.17% C.   5.78% H.
against 94.4% C.   6.6% H. as previously calculated.

(3) Over a catalyst, consisting of highly active charcoal heated to 400° C. are conducted the vapours of m-xylenecarbinol-acetate mixed with air during which operation the ester effects the closing of the ring to form the $\beta$-methylanthracene with elimination of acetic acid and water. By recrystallizing the reaction product from glacial acetic acid the $\beta$-methylanthracene is obtained in a pure state and with a yield of 30%, the mother liquors containing benzoyl-m-xylene in the amount of 50% of the ester employed.

We claim:

1. As a new product acenaphtanthracene of the following constitution:

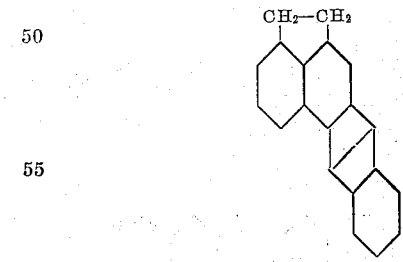

melting at 191° C. forming yellow laminæ which are soluble in concentrated sulfuric acid with a reddish violet colour and an intense fluorescence.

2. The process which comprises conducting over highly porous bodies having highly active properties and the property of extensively absorbing gases and vapors, at a temperature sufficient to cause a ring closing but below a carbonizing temperature, the vapors of a compound possessing the atom grouping:

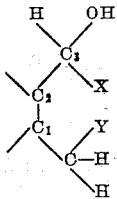

wherein $C_1$ and $C_2$ represent carbon atoms belonging to an aromatic or heterocyclic nucleus, X represents an aliphatic, aromatic or heterocyclic residue, in which at least one carbon atom which is in $\beta$-position to the carbon atom marked $C_3$ contains a hydrogen atom attached to it and Y represents hydrogen, chlorine or a hydrocarbon residue.

3. The process which comprises conducting over highly porous bodies, having highly active properties and the property of extensively absorbing gases and vapors, at temperatures between 320° C. and 450° C. in the presence of an oxygen carrying catalyst the vapors of a compound possessing the atom grouping

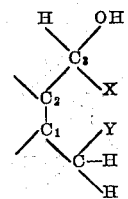

wherein $C_1$ and $C_2$ represent carbon atoms belonging to an aromatic or heterocyclic nucleus, X represents an aliphatic, aromatic or heterocyclic residue, in which at least one carbon atom which is in $\beta$-position to the carbon atom marked $C_3$ contains a hydrogen atom attached to it, and Y represents hydrogen, chlorine or a hydrocarbon residue.

4. The process which comprises conducting over highly porous bodies, having highly active properties and the property of extensively absorbing gases and vapors, at temperatures between 320° C. and 450° C. in the presence of an oxygen carrying catalyst and oxidizing media the vapors of a compound possessing the atom grouping

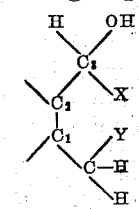

wherein $C_1$ and $C_2$ represent carbon atoms belonging to an aromatic or heterocyclic nucleus, X represents an aliphatic, aromatic or heterocyclic residue, in which at least one carbon atom which is in β-position to the carbon atom marked $C_3$ contains a hydrogen atom attached to it, and Y represents hydrogen, chlorine or a hydrocarbon residue.

5. As new products cyclic compounds which are produced by closing the ring of compounds of the formula

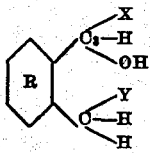

wherein the symbols signify the following: R an acenaphthene or heterocyclic substituted or nonsubstituted residue; Y hydrogen or chlorine or a hydrocarbon residue; X an aliphatic, aromatic or heterocyclic residue, in which at least one carbon atom which is in β-position to the atom marked $C_3$ contains a hydrogen atom attached to it.

In testimony whereof we affix our signatures.

Dr. OTTO NICODEMUS.
Dr. WALTER BERNDT.